(12) United States Patent
Sundaram

(10) Patent No.: US 9,667,658 B2
(45) Date of Patent: May 30, 2017

(54) SYSTEMS AND METHODS FOR MANAGING PERFORMANCE OF IDENTITY MANAGEMENT SERVICES

(71) Applicant: Wipro Limited, Bangalore (IN)

(72) Inventor: Shankar Sundaram, Chennai (IN)

(73) Assignee: WIPRO LIMITED, Bangalore (IN)

( * ) Notice: Subject to any disclaimer, the term of this patent is extended or adjusted under 35 U.S.C. 154(b) by 169 days.

(21) Appl. No.: 14/831,148

(22) Filed: Aug. 20, 2015

(65) Prior Publication Data

US 2017/0006063 A1    Jan. 5, 2017

(30) Foreign Application Priority Data

Jun. 30, 2015  (IN) ........................... 3329/CHE/2015

(51) Int. Cl.
*H04L 29/06* (2006.01)
*G06F 9/445* (2006.01)

(52) U.S. Cl.
CPC ............... *H04L 63/20* (2013.01); *G06F 8/65* (2013.01); *H04L 63/0815* (2013.01); *H04L 63/102* (2013.01)

(58) Field of Classification Search
CPC ... H04L 29/06; H04L 63/0815; H04L 63/102; H04L 63/20; G06F 8/65
See application file for complete search history.

(56) References Cited

U.S. PATENT DOCUMENTS

| 7,346,923 B2 | 3/2008 | Atkins et al. |
| 8,151,332 B2 | 4/2012 | Cross et al. |
| 2006/0174350 A1 | 8/2006 | Roever et al. |
| 2009/0144802 A1 | 6/2009 | Tillery et al. |
| 2013/0036458 A1 | 2/2013 | Liberman et al. |
| 2014/0351824 A1 | 11/2014 | Jackson |
| 2015/0269006 A1* | 9/2015 | Caufield ................. G06F 9/524 718/105 |
| 2016/0094483 A1* | 3/2016 | Johnston ............... H04L 47/827 709/226 |
| 2016/0188560 A1* | 6/2016 | Chen ................. G06F 17/30893 715/222 |

* cited by examiner

*Primary Examiner* — Hadi Armouche
*Assistant Examiner* — Hee Song
(74) *Attorney, Agent, or Firm* — Finnegan, Henderson, Farabow, Garrett & Dunner, LLP

(57) ABSTRACT

This disclosure relates generally to identity management, and more particularly to systems and methods for managing performance of identity management services. In one embodiment, a processor-implemented identity management performance control method is disclosed. The method may include receiving, via one or more hardware processors, an identity management architecture specification. The method may also include identifying, via the one or more hardware processors, a plurality of identity management attributes for the identity management architecture specification. The method may include selecting, via the one or more hardware processors, measurement criteria based on a target environment for implementing the identity management architecture. The method may include calculating, via the one or more hardware processors, an attribute measurement quotient for the plurality of identified identity management attributes using the selected measurement criteria.

18 Claims, 12 Drawing Sheets

Identity Attribute Table (IAT)                                                         1000

| Resource Name | Attribute | Weightage | HQM | IQM | PQM | Best Fit | D(A) | R(A) | PID | Comments | DW | Start Time | End Time | Status | JT | ET |
|---|---|---|---|---|---|---|---|---|---|---|---|---|---|---|---|---|
| AD | CN | 12.00 | ☒ |  |  | Y | "abc" | "abc" | 12345 | "SIQAM AD" | 0.00 | 12/13/14 5:22 PM | 12/13/14 5:22 PM | Completed | ADD | Provisioning |
| DB | ID | 1.00 |  | ☒ | ☐ | N | "R01234" | "R01234" | 12347 | "MIQAM DB" | 1.00 | 12/13/14 5:22 PM | 12/13/14 5:27 PM | Failed | MOD | Provisioning |
| Mainframe |  |  |  |  |  |  |  |  |  |  |  |  |  | Started | DEL | Reconciliation |
| App1 |  |  |  |  |  |  |  |  |  |  |  |  |  | Paused | ADD | Reconciliation |
| App2 |  |  |  |  |  |  |  |  |  |  |  |  |  | Pending | MOD | Provisioning |
| OS |  |  |  |  |  |  |  |  |  |  |  |  |  | Stopped | DEL | Provisioning |
|  |  |  |  |  |  |  |  |  |  |  |  |  |  |  | ADD | Provisioning |
|  |  |  |  |  |  |  |  |  |  |  |  |  |  |  | MOD | Authentication |
|  |  |  |  |  |  |  |  |  |  |  |  |  |  |  | DEL | HR Feed |
|  |  |  |  |  |  |  |  |  |  |  |  |  |  |  | ADD | Application1 |
|  |  |  |  |  |  |  |  |  |  |  |  |  |  |  | MOD | N/A |
|  |  |  |  |  |  |  |  |  |  |  |  |  |  |  | DEL | N/A |

☒ High Quotient
▨ Interim Quotient
☐ Poor Quotient

Fig. 10A

Identity Attribute Table (IAT)  1000

| SIQAM | MIQAM | NC | MC | IQM Type | ATC | PBT | CE | PE | MG | RA | LD | LT | S/F | PTY | Success | Failure |
|---|---|---|---|---|---|---|---|---|---|---|---|---|---|---|---|---|
| Y | N | 1 | 10 | User | 0:02:00 | 0:03:00 | | | | 1 | Min | | 1.00 | H | ✓ | |
| N | Y | 2 | 15 | Group | | | | | Y | 0 | Max | | 0.99 | M | | ✓ |
| | | | | Object | | | | | | | | | | L | | |
| | | | | Account | | | | | | | | | | | | |
| | | | | Role | | | | | | | | | | | | |
| | | | | ACL | | | | | | | | | | | | |
| | | | | Attribute | | | | | | | | | | | | |
| | | | | Service | | | | | | | | | | | | |
| | | | | Feed | | | | | | | | | | | | |
| | | | | Installation | | | | | | | | | | | | |
| | | | | Upgrade | | | | | | | | | | | | |

Fig. 10B

SYSTEMS AND METHODS FOR MANAGING PERFORMANCE OF IDENTITY MANAGEMENT SERVICES

PRIORITY CLAIM

This U.S. patent application claims priority under 35 U.S.C. §119 to India Application No. 3329/CHE/2015, filed Jun. 30, 2015. The entire contents of the aforementioned application are incorporated herein by reference.

TECHNICAL FIELD

This disclosure relates generally to identity management, and more particularly to systems and methods for managing performance of identity management services.

BACKGROUND

Many web-based services require individual user accounts that are unique to the service. Identity management principles provide a framework for organizing individual user identities along with their authentication, authorization, and privileges in a given system. Identity management allows system administrators to easily create and remove user identities, manage access privileges, and monitor resource usage, for example. These features are critical to the operation of larger systems that rely on individual user identities, such as enterprise systems and electronic exchange systems.

Conventionally, user administration tasks were performed manually. For example, an administrator would have to enter necessary information into the system using a user interface to, for example, create a new user identity. Because user-driven manual processes are less efficient, conventional identity management systems may suffer from extended downtime when problems occur. Additionally, existing systems do not.

SUMMARY

In one embodiment, a processor-implemented identity management performance control method is disclosed. The method may include receiving, via one or more hardware processors, an identity management architecture specification. The method may also include identifying, via the one or more hardware processors, a plurality of identity management attributes for the identity management architecture specification. Further, the method may include selecting, via the one or more hardware processors, measurement criteria based on a target environment for implementing the identity management architecture. The method may additionally calculating, via the one or more hardware processors, an attribute measurement quotient for the plurality of identified identity management attributes using the selected measurement criteria. The method may include generating, via the one or more hardware processors, instructions to improve performance of the identity management architecture in the target environment based on the calculated attribute measurement quotient.

In one embodiment, A non-transitory computer-readable medium is disclosed. The computer-readable medium may store computer-executable application programming interface economy indexing instructions. The instructions may include receiving, via one or more hardware processors, an identity management architecture specification. The instructions may include identifying, via the one or more hardware processors, a plurality of identity management attributes for the identity management architecture specification. The instructions may also include selecting, via the one or more hardware processors, measurement criteria based on a target environment for implementing the identity management architecture. Further, the instructions may include calculating, via the one or more hardware processors, an attribute measurement quotient for the plurality of identified identity management attributes using the selected measurement criteria. The instructions may include generating, via the one or more hardware processors, instructions to improve performance of the identity management architecture in the target environment based on the calculated attribute measurement quotient.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 10A illustrates a first portion of an exemplary report in accordance with some embodiments of the present disclosure.

FIG. 10B illustrates a second portion of an exemplary report in accordance with some embodiments of the present disclosure.

DETAILED DESCRIPTION

Figure 1:
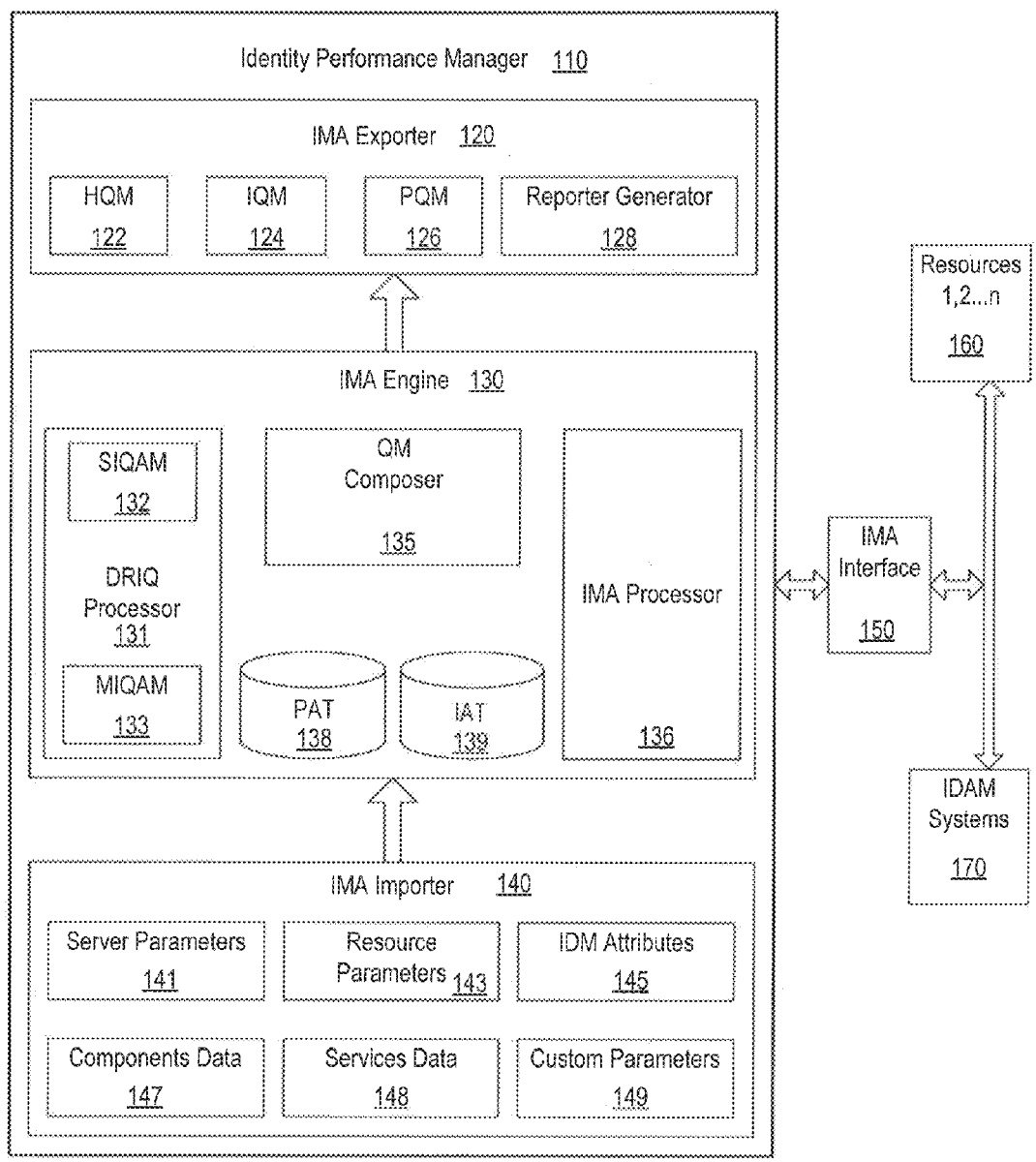
FIG. 1 is a functional block diagram of an exemplary identity performance manager system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Identity Management (IDM) products automate user life cycle activities and minimize organizational security risks. According to the current organization trends, many organizations are implementing IDM products to automate and streamline identity provisioning. IDM products may also meet high security standards and provide uninterrupted services to customers. IDM manages components and services to produce expected results in accordance with user provisioning. The variation in the performance of IDM products may affect organization productivity. For example, poor IDM performance may result in performance degradation and resource downtime.

Moreover, when implementing a new IDM product, organizations must coordinate a multitude of complex computer systems. Even when such a transition is properly planned, the integration of the new IDM product may require system downtime, resulting in outages for customers and creating issues with resource integrity. For example, the new IDM product may not properly interface with certain devices or functions. Certain systems may be affected by far-reaching factors that are not discovered until implementation actually occurs.

Currently, IDM systems have no way to identify all services and systems that may be affected by a new product. For example, existing systems have no way to easily identify affected components, analyze changes in the behavior of an IDM system, or measure the performance impart of a product change on IDM components and services. Such features may be used to estimate the maximum performance of each component for a given organizational environment.

Illustrative embodiments of the present disclosure are listed below. In one embodiment, an IDM system is disclosed. The system may determine the performance quality of the components and services in an IDM environment. For example, the system may measure the potential performance of components and services before and after changes are implemented in a particular system. Additionally, disclosed systems may estimate the amount of input data a particular system, component, or service can process successfully (e.g., a success rate). Disclosed systems may also determine the amount of resources necessary to achieve satisfactory results or optimal performance. In other embodiments, a process and computer-readable media are disclosed for implementing the functions of disclosed systems.

FIG. 1 is a functional block diagram of an exemplary identity performance manager (IPM) system 100 according to some embodiments of the present disclosure. IPM system is illustrated as a series of functional blocks. These blocks may represent hardware structures, software components, or various combinations of hardware and software. For example, the functional blocks may represent application-specific integrated circuits (ASICs), field-programmable gate arrays (FPGAs), processors running software programs, and/or software routines. The functional blocks may be rearranged or combined so long as they provide the disclosed functionality consistent with this disclosure.

System 100 may include IPM 110 to measure the quality of services provided by an IDM product. For example, IPM 110 may monitor, record, and track individualized data for each distinct service provided by an IDM product. IMP 110 may track affected dependencies within and between IDM products. For example, IPM 110 may determine and record the path of actions between services that may be affected by a particular change. By clearly distinguishing affected services and functions, IPM 110 may also minimize the man hours and material cost required by a product change. IPM 110 may measure the quality of each resource by capturing the behavior of the data in a current environment. IPM 110 may compare the results after a change with the best performance results that were achieved prior to implementing any changes. IPM 110 may set baseline expectations based the best practices of the IDM product or expected process goals.

IPM 110 have an architecture that operates using Available Environment Workload Traffic (AEWT) principles. In an embodiment, IPM 110 may use real-time system status data to provide performance predictions reflective of current conditions. For example, all measurements used by system 100 may depend on actual resource availability at a particular instant.

System 100 may allow IPM 110 to connect to resources 160 and identity access manager (IDAM) system 170. In an embodiment, IPM 110 may determine real-time system data by connecting to resources 160 and IDAM system 170. IDAM system 170 may be a single system or multiple systems. In an embodiment, IDAM System 170 may be an IDM product deployed in a customer environment. For example, IDAM system 170 may include identity manager, access manager, access governance products, such as Ping, SUN now 'Oracle', IBM TIM, CA, Novell, and Hitachi. Resources 160 may be internal and/or external applications that are integrated with IDAM system 170. In an embodiment, resources 160 may be third party systems used by an organization. For example, resources 160 may include databases, directories, servers, thick and thin applications, and/or repositories, resources 160 may be implemented on hardware servers or virtualized environments.

System 100 may include identity management attribute (IMA) interface 150. IPM 110 may utilize IMA interface 150 to communicate with IDAM system 170 and resources 160. In an embodiment, a set of pre-defined interfaces and methods are used to create a communication link between IPM 110 with IDAM system 170 and resources 160. IDAM system 170 may invoke predefined methods to establish the connection and execute data transfer.

IPM 110 may include IMA importer 140. In an embodiment, IMA importer 140 may receive data from IDAM system 170 and resources 160. IMA importer 140 may collect data to measure the performance of IDM deployments, such as in IDAM system 170. IMA importer 140 may contain information about the components inside IDAM system 170. The component information may describe the services inside each component in the form of parameters, attributes, and custom or user-defined data.

IMA importer 140 may import and store server parameters 141. For example, server parameters 141 may include real-time server data, such as server connection status information. IMA importer 140 may import and store resource parameters 143 of resources 160. For example, resource parameters 143 may include real-time processing availability, such as available memory storage, current processing bandwidth, and any queued processes. IMA importer 140 may import and store IDM attributes 145. For example, IMA importer 140 may create a data store to indicate the enabled and/or required components data 147. Example IDM components may include an identity manager, access manager, policy manager, directory servers, data stores, switches, routers, and/or network components. Each IDM component may provide an IDM services. IMA importer 140 may store services data 148 to record data related to IDM services of the IDM components. Services may include, for example, user identity creation, revoking a user identity, adding roles to a role identity, and managing privileges. IDM services may utilize specific attributes and/or custom parameters. IMA importer 140 may process and store IDM attributes 145 and custom parameters 149. For example, IMA importer 140 may log the data used by various services. Exemplary IDM attributes 145 may include a user identifier, a privilege code, a role, and/or a screenname.

IMA importer 140 may import the data to IMA engine 130 to process the consolidated data. In an embodiment, IMA engine 130 may perform core processing functions for IPM 110.

IMA importer may include IMA processor 136. In an embodiment, IMA processor 136 may process and cleanse the raw data from IMA importer 140. For example, IMA processor 136 may store the cleansed data in an organized group based on the segregation of identities based on a corresponding IMA Architecture and UPEARL mode. The UPEARL may provide a framework for organizing the mode of operation of the identities in an organization. For example, UPEAL may facilitate the segregation of modes based on the following type:

U—User Identity.
P—Physical & Privilege Identity.
E—Environment & Event Identity.
A—Access Identity.
R—Resource & Role Identity.
L—Logical Identity.

IMA engine 130 may utilize Deliver & Retain Identity Quality (DRIQ) model to measure the quality and behavior of the product. In an embodiment, IMA engine 130 may include DRIQ processor 131 to implement a model to measure the quality of service provided by the product. For example, DRIQ processor 131 may measure the ratio of success to failure. DRIQ processor 131 may store the optimal proportion of resources to provide un-interrupt services.

In an embodiment, DRIQ processor 131 may measure perform metrics calculations for individual attributes or for the entire system. For example, DRIQ processor 131 may measure both SIQAM (Single Identity Quotient Attribute Measurement) and MIQAM (Multiple Identity Quotient Attribute Measurement) from the data received from IMA Processor. In an embodiment, DRIQ processor 131 may include dedicated processors to provide analysis under separate schemes of the DRIQ model. DRIQ processor 131 may include SIQAM 132 and MIQAM 133 to perform the respective calculations.

IMA engine 130 may classify the results provided by DRIQ processor 131. In an embodiment, IMA engine may include QM composer 135 to identify a particular quotient mode for the results. QM composer 135 may receive SIQAM and MIQAM data and classify system performance based on the ratios of various results. For example, QM composer 135 may perform calculations for a high quotient mode (HQM), interim quotient mode (IQM), and poor quotient mode (PQM). HQM have provide short execution time with expected results. IQM may provide expected results with standard execution time. PQM may provide unexpected results with excessive execution time. For example, PQM may indicate that the service or component failed to provide correct results regardless of how long of a run time is used. Such a designation may indicate the use of incorrect logic in the IDM system.

IMA engine 130 may store pre-defined attribute data and identity attribute data. In an embodiment, IMA engine 130 may include specific storage for data using pre-defined attribute table (PAT) 138 and identity attribute table (IAT) 139.

In an embodiment, PAT 138 may store pre-defined attribute data used to measure and maintain the identity attributes. For example, PAT 138 may store mandatory IDM attributes and user-defined IDM attributes. IMA engine 130 may use the attributes to calculate the actual and potential performance of the system.

In an embodiment, IAT 139 may store the real time performance of identity attributes. For example, IAT 139 may record alphanumeric values.

IPM 110 may include IMA exporter 120 to hold processed data. In an embodiment, IMA exporter 120 may store alphanumeric values, reports, and graphs. It contains both Before Execution Result (BER) and After Execution Result (AER) data. The BER and AER data may be used by IPM 110 to determine the optimized performance configuration and update IAT 139 to identify the best fit.

IMA exporter 120 may include separate processors to present data for different modes. In an embodiment, IMA exporter 120 may include HQM 122, IQM 124, and PQM 126. These distinct components may provide data to generate a report recording the changes to optimize performance of an IDM system. In an embodiment, IMA exporter 120 may include report generator 128 to receive data from HQM 122, IQM 124, and/or PQM 126. Report generator 128 may format received data and provide output indicating the various quotients and resulting modes.

Figure 2:
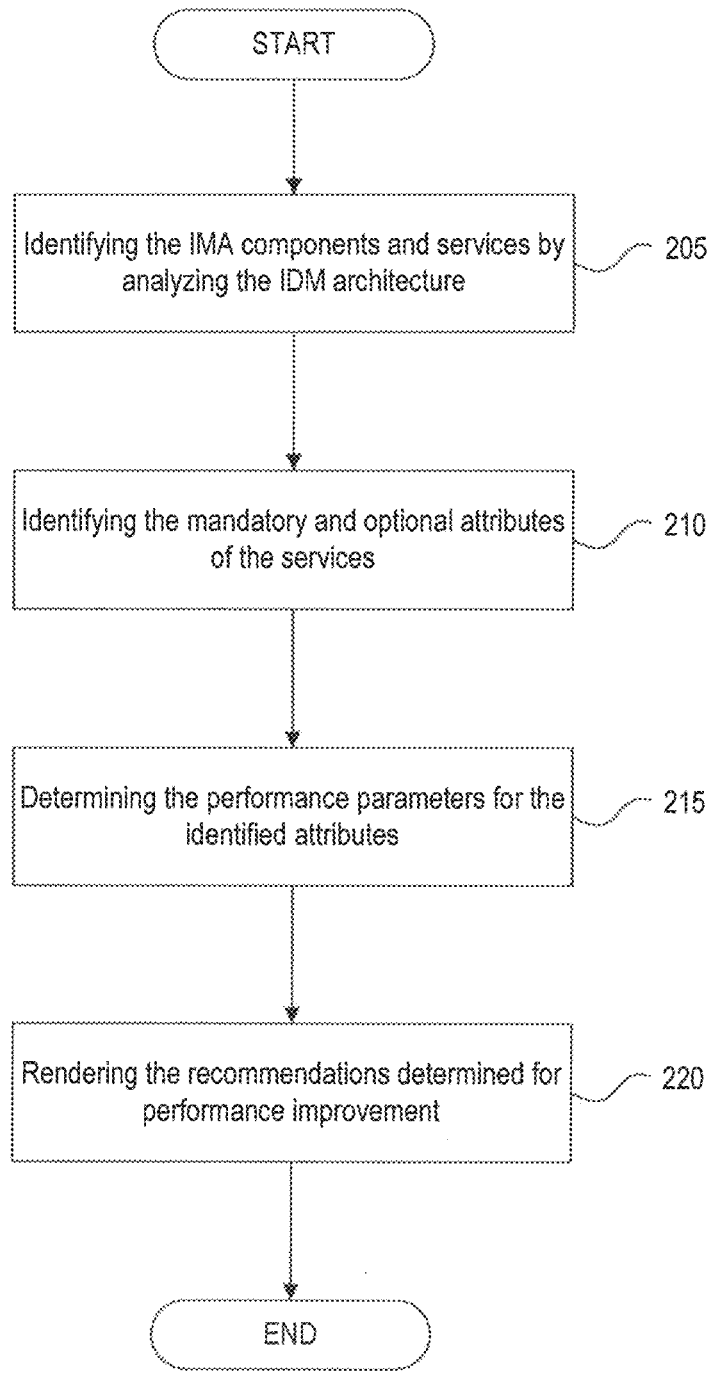
FIG. 2 is a flow diagram illustrating an exemplary identity performance manager process in accordance with some embodiments of the present disclosure.

FIG. 2 is a flow diagram illustrating an exemplary identity performance manager process 200 in accordance with some embodiments of the present disclosure. Process 200 may be implemented using some or all of system 100. The steps of process 200 may be performed out of order commensurate with the objects of this disclosure.

Process 200 may begin with step 205, where IPM 110 identifies the IMA components and services of a target system. In an embodiment, IMP 110 may Identify the IMA components and services by analyzing the IDM architecture. IPM 110 may first analyze the IDM architecture that is implemented in IDAM system 170. IPM 110 may identify the components that are used by the IDM product to perform the IDM operations. Next step, IMP 110 may identify the services that are provided by each component. Based on the provided services, system 100 may identify all the attributes that are utilized in the services.

In an embodiment, IPM 110 may analyze the current IDM architecture of IDAM system 170. For example, IPM 110 may connect with IDAM system 170 and resources 160 through IMA interface 150. IPM 110 may analyze the entire IDM architecture IDAM system 170, including resources 160.

Figure 3:
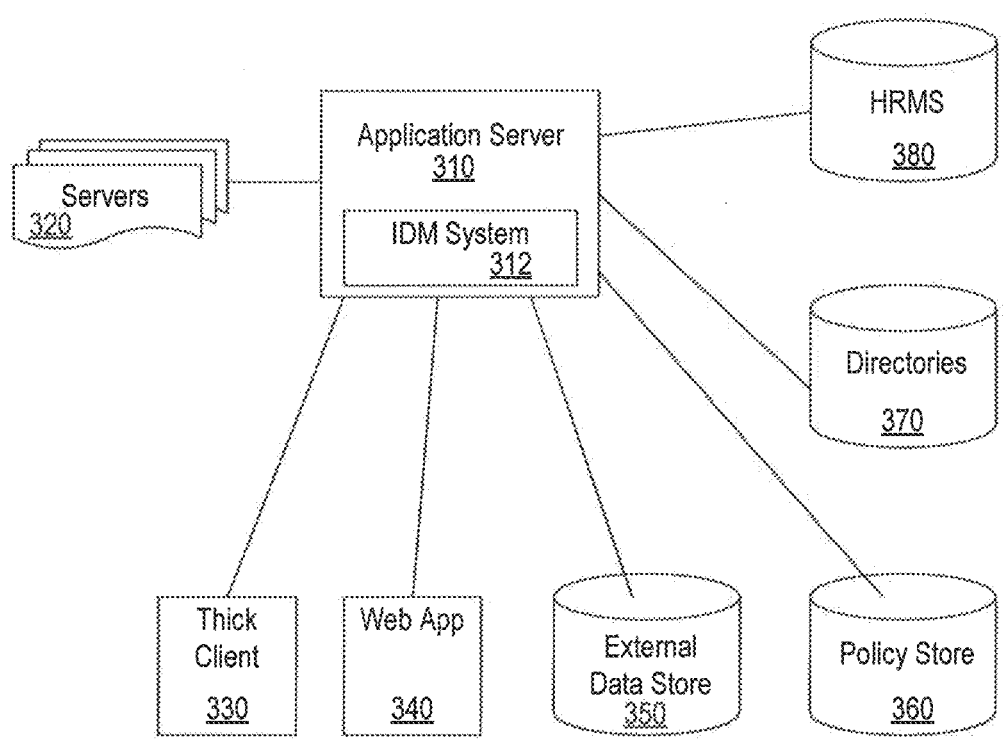
FIG. 3 illustrates an exemplary identity management architecture according to some embodiments of the present disclosure.

FIG. 3 illustrates an exemplary identity management architecture 300 according to some embodiments of the present disclosure. In an embodiment, IPM 110 may analyze architecture 300 (step 205). IPM 110 may connect to application server 310. For example, IPM 110 may analyze IDM system 312 of application server 310. In an embodiment, IPM 110 may determine which components IDM system 312 interacts with. By crawling the connection of application server 310, IPM 110 may determine that IMS system 312 interacts with human resource management system (HRMS) 380, directories 370, policy store 360, external data store 350, web application 340, thick client 330, and servers 320. IPM 110 may map and store architecture 300.

Returning to FIG. 2, in certain embodiments, IPM 110 may identify the components in step 205. Based on the IDM architecture analysis performed by IMA Importer 140, IPM 110 may identify the components that are involved in IDM architecture 300. As each component in the IDM system performs some operation on the resource side IPM 110 may record the types of identities from each component in architecture 300.

In an embodiment, IMA importer 140 may use the UPEARL model to segregate the identities from IDM system 170 and resources 160. The UPEARL Model may allow IMA importer to separate the organization identities into a list of identities.

Figure 4:
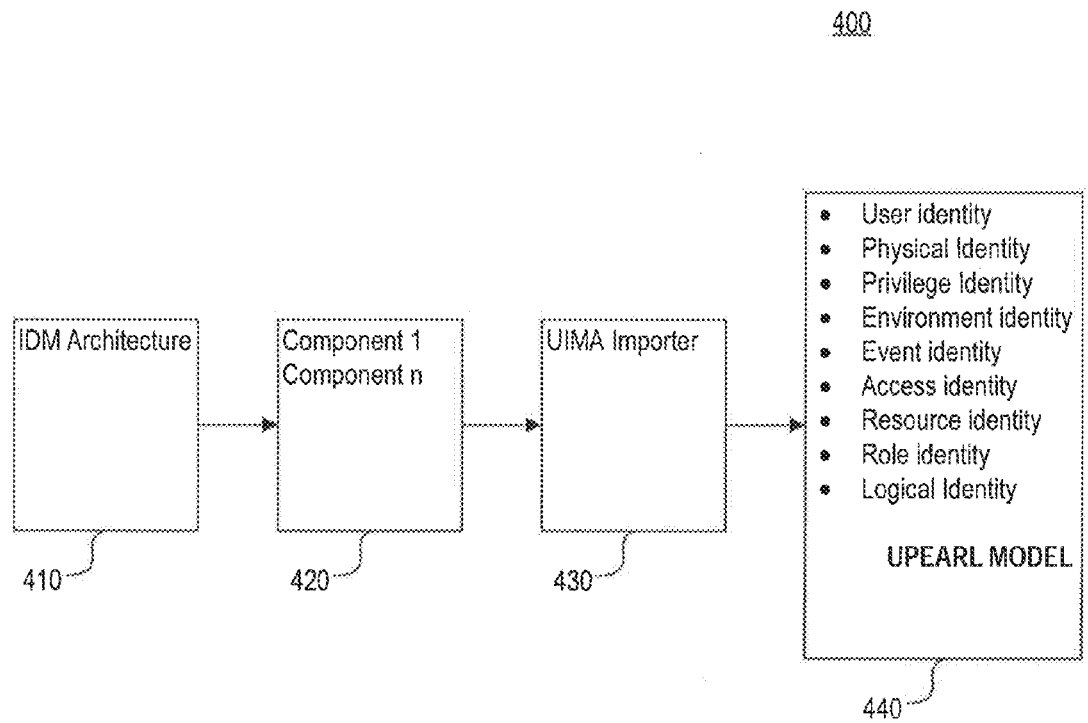
FIG. 4 illustrates an exemplary workflow in accordance with some embodiments of the present disclosure.

FIG. 4 illustrates exemplary UPEARL workflow 400 in accordance with some embodiments of the present disclosure. Workflow 400 may be a process performed by a computing system, such as IPM 110. Step 205 of FIG. 2 will now be discussed with reference to workflow 400 of FIG. 4.

In step 205, IMA importer 140 may receive information regarding the IDM architecture. For example, IMA importer may receive information describing architecture 300. Using the architecture information, IMA importer 140 may identify components of architecture 300 (step 410). In an embodiment, IMA importer may analyze the IMA architecture to identify components present in or used by the current IDM architecture (step 420). For example, as each component in the IDM system (e.g., IDAM system 170) performs some operation on the resource side the IPM 110 may analyze the operations to find all the types of identities from each component in the architecture. In an embodiment, a universal identity management architecture (UIMA) importer (e.g., IMA Importer 140) may receive the component data (step 430). Example components in an IDM architecture may include an identity manager, access manager, policy manager, directory servers, data stores, switches, routers, and network interfaces.

A UIMA importer may further use the UPEARL Model to segregate the identities of IDM systems and their connected resources (step 440). In an embodiment, IMA importer 140 may separate the entire organization identities into a list of identities using the UPEARL Model. For example, the UPEARL Model may include identities such as user identity, physical identity, privilege identity, environment identity, event identity, access identity, resource identity, role identity, and logical identity.

Returning to FIG. 2, in step 205, IMA importer 140 may identify services used in the IDM architecture. In an embodiment, IMA importer 140 may determine which services are associated with identified components. For example, using the details about the components and the related identities retrieved using the UPEARL Model, IMA Importer 140 may identify the services or process that are offered by each components. Example services in an exemplary IDM architecture may include:

User identity services: Create ( ), Delete ( ), Revoke ( ), modify( )
Role identity services: Add_role ( ), Delete_role ( )
Privilege identity services: admin ( ), manager ( ), user In an embodiment, step 205 may also include IMA importer identifying attributes. IMA Importer 140 may use the details about the services identified in the details about the attributes and corresponding parameters for each service in each component. example attributes in an exemplary IDM architecture may be identified as follows:

User Identity→Create_user( )→Sn, Cn, Id, . . . Attribute N
Role Identity→Add_role( )→Userid, Previous_Role, . . . Attribute N IMA importer 140 may send attribute information to IMA engine 130. In an embodiment, IMA importer 140 may finalize data as a list of attributes and corresponding parameters. IMA importer 140 may format the data and transmit the data to IMA engine 130.

Process 200 may include step 210. In an embodiment, IPM 110 may identify attributes as option and/or mandatory. IMA engine may determine which attributes are necessary for services to function properly. For example, after receiving the detailed list of attributes and corresponding parameters from IMA importer 140, IMA Engine 130 may identify the mandatory and optional attributes of the services using IMA processor 136. IMA processor 136 may determine requisite attributes based on the identity product used in the IDM architecture. The resulting requisite attributes may be used to measure potential performance of each component and the corresponding component services of an IDM system. IMA Processor 136 may identify the mandatory and optional attributes of the services by analyzing the forms used in an IDM system. Based on the indications or codes provided in the forms (e.g., stars noting a required field) IMA processor 136 will code the status of the attribute. The mandatory attributes of each IDM product may vary. Thus, IPM 110 may adapt to each IDM product. For example, IMA processor 136 may identify the mandatory attributes information from each form processed by an IDM system in performing user life cycle management. IMA processor 136 may feed mandatory attributes to PAT 138. For example, IMA processor 136 may generate a predefined attribute list (PAL) of mandatory attributes and transmit the PAL to PAT 138. The optional attributes may be based on customer requirements, which may be stored as an optional attribute list (OAL). The OAL may be stored in IAT 139. In an embodiment, PAT 138 may be in an initial null state, prior to set up. In another embodiment, PAT 138 may be preset with predefined values. PAT 138 may be updated with the present real time values.

IPM 110 may rely on organizational requirements to Identify attributes. For example, "service1( )" may utilize a plurality of mandatory attributes and a plurality of optional attributes. Attributes may be extracted in different ways. In an embodiment, service-based extraction (SBAE) may analyze the forms used in IDM services and determine the attributes for the service that are required and optional. In an embodiment, custom-defined extraction (CDAE) may utilize input to determine which factors are required.

Figure 5:
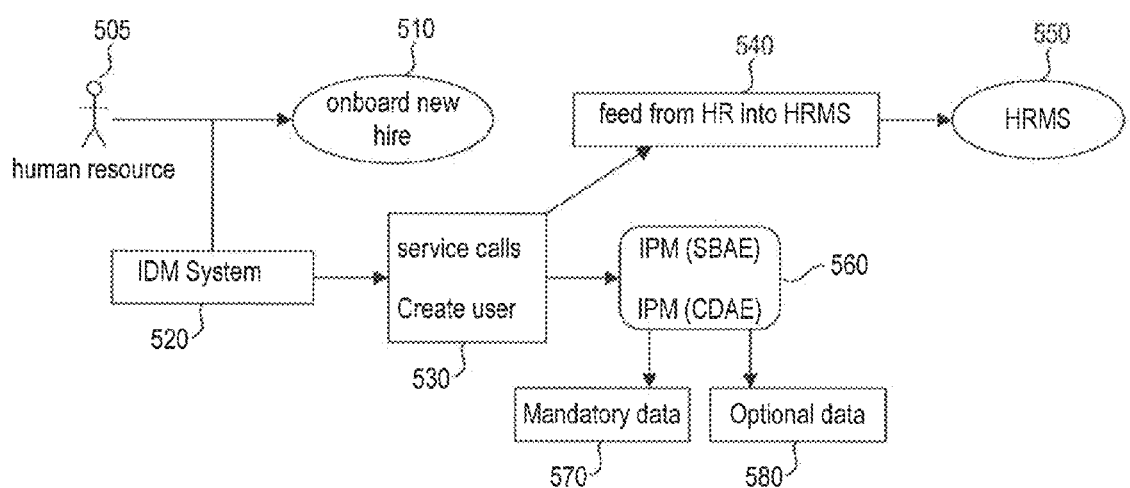
FIG. 5 illustrates another exemplary workflow in accordance with some embodiments of the present disclosure.

FIG. 5 illustrates another exemplary workflow in accordance with some embodiments of the present disclosure. In environment 500, human resource 505 performs new hire process 510 using IDM system 520. For example, IDM system 520 may perform calls, such as service calls and user creation prompts to onboard a new hire (step 530). The IDM system may forward the data received from the service calls, as well as user creation request to human resource management system 550 (step 540). While the process runs (e.g., step 530 and step 540), IPM 110 may perform SBAE and/or CDAE (step 560) to identify mandatory data 570 and optional data 580 for the onboard process. For example, IPM 110 will determine which attributes are required for the create user service.

Figure 6:
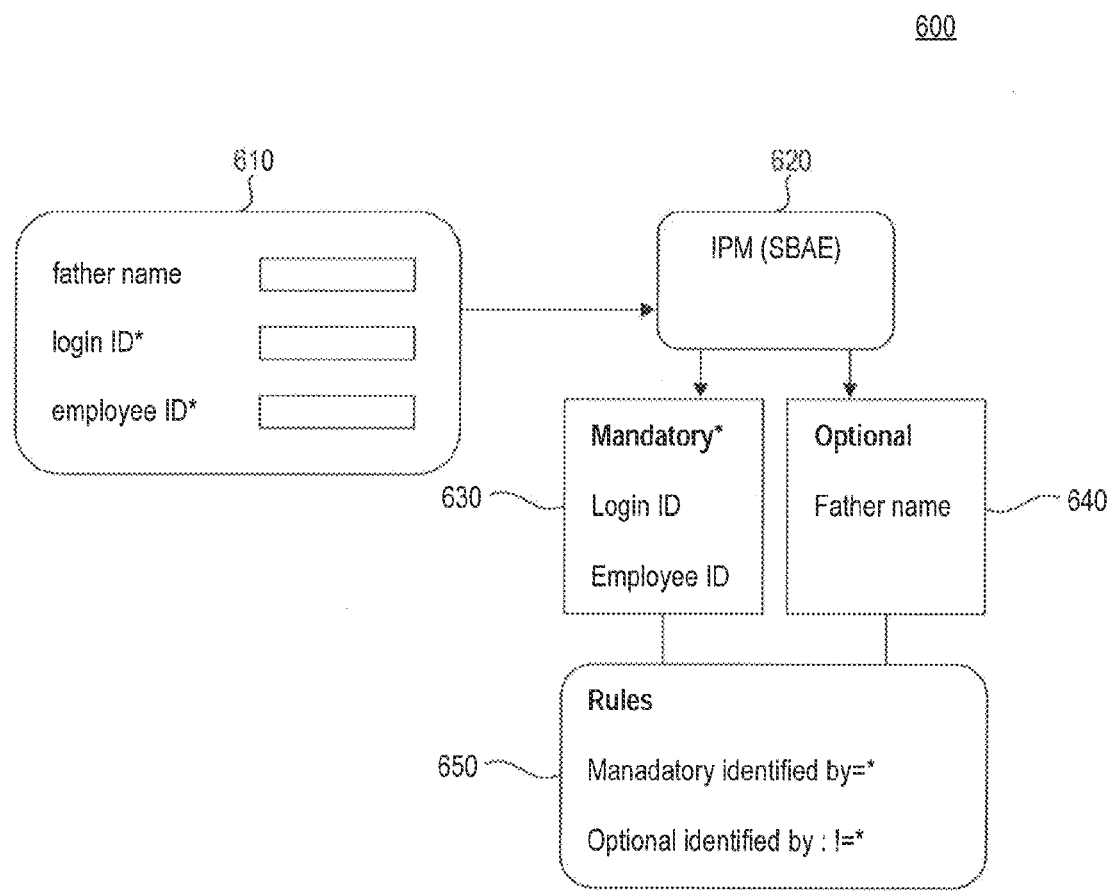
FIG. 6 illustrates another exemplary workflow in accordance with some embodiments of the present disclosure.

FIG. 6 illustrates another exemplary workflow in accordance with some embodiments of the present disclosure.

Process 600 illustrates an example to determine required parameters in environment 500 using SBAE.

In an embodiment, mandatory and optional data extraction may be based on IDM services running. Using form-based extraction, IPM 110 monitors all the requests submitted and processed in IDM systems using forms. Each form may have mandatory and optional attributes for each service. For example, in environment 500, using SBAE, IPM 110 parses each IDM request for each service to gather the mandatory and optional attributes. Form 610 may have a plurality of attributes to perform the user creation service. The form may indicate which of these attributes (father name, login ID, employee ID) are mandatory.

IPM 110 may parse and analyze the form (step 620). Using rules 650, IPM 110 may identify mandatory fields 630 and optional fields 640. For example, IPM 110 may determine that fields with an asterisk are mandatory. Rules 650 may result from an analysis of form 610 performed by IPM 110. IPM 110 may use text analysis or regular expressions to generate rules based on explicit content of form 610, as well as inferences made from the form structure. For example, IPM 110 may parse form 610 which may contain a note indicating that "Fields marked with an asterisk" are required (not shown in FIG. 6). An example of inferences may include IPM 110 generating a rule that bold fields are required when a bold font is used for the majority of the fields. IPM may use additional machine learning techniques to analyze form formats to automatically identify required fields.

Figure 7:
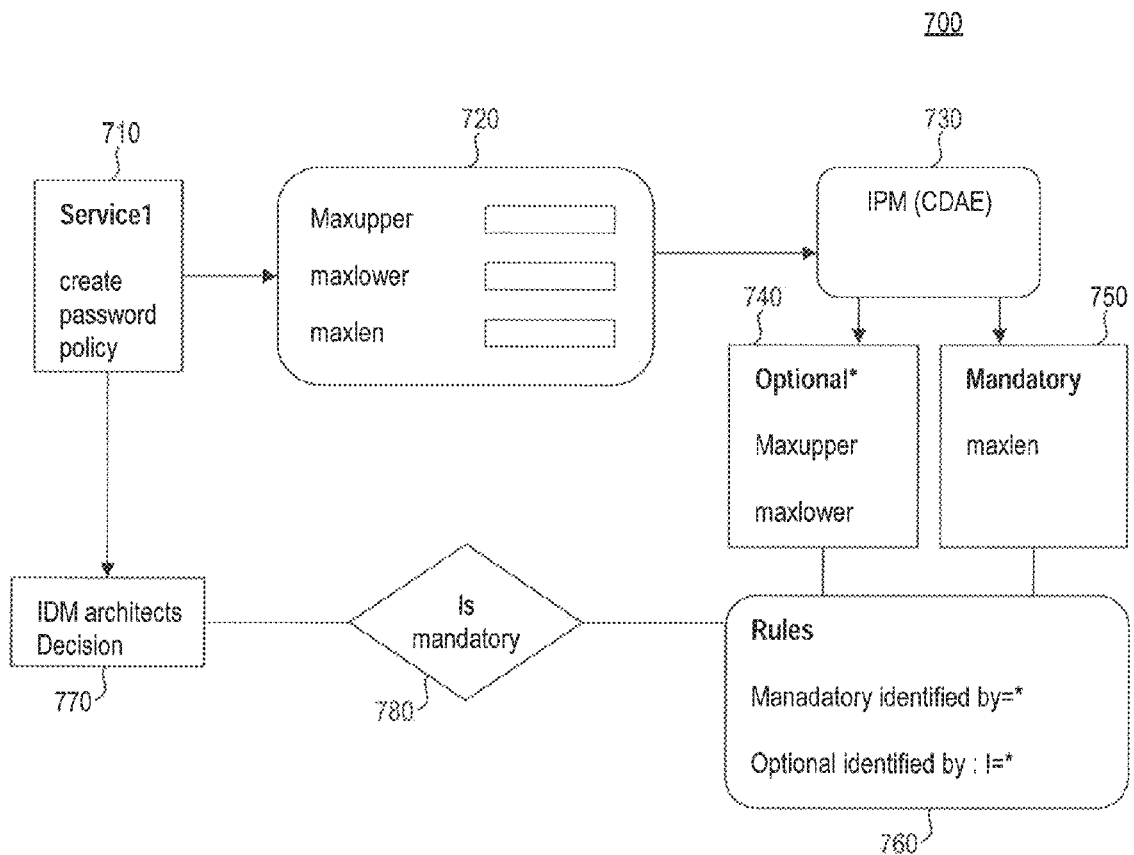
FIG. 7 illustrates yet another exemplary workflow in accordance with some embodiments of the present disclosure.

FIG. 7 illustrates yet another exemplary workflow in accordance with some embodiments of the present disclosure. Process 700 illustrates an example to determine required parameters in environment 500 using CDAE.

In an embodiment, predefined extraction may be based on customer extraction definitions. IDM specifications may define services needs and, correspondingly, what attributes are necessary to fulfill the service. For example, IPM 110 may receive service specification 710, which may include password creation policies. Specification 710 may include a plurality of fields 720 that outline various password format requirements, such as maximum length and number of uppercase characters. IPM may analyze the fields of specification 710 using CDAE. While fields 720 do not include an symbol tying them to rules 760, IPM may receive additional input 770 indicating which fields are mandatory (step 780). Based on the additional input 770, IPM 110 may generate rules 760, which may allow IPM 110 to classify fields 720 into option fields 740 and mandatory fields 750. While fields 720 do not include an asterisk as shown, input 770 may identify fields by explicit additional instruction.

IPM 110 may use CDAE and SBAE processes in combination. In embodiments, various combinations of CDAE and SBAE results may be used to identify required fields with increasing accuracy. For example, when CDAE input does not provide instructions to cover all fields or services, IPM 110 may use SBAE to determine whether the remaining fields or services are required. In an embodiment, IPM 110 may perform SBAE even when CDAE input is provided. For example, IPM 110 may use the CDAE input to train the machine learning algorithms used for SBAE classifying. Once fields are identified as mandatory or optional, process 200 may proceed to step 215.

Returning to FIG. 2, process 200 may include step 215 to determine the performance parameters for identified attributes. In an embodiment, after identifying all attribute details, IPM 110 may transmit the attribute data to DRIQ processor 131. For example, DRIQ processor 131 may receive data indicating the required and optional attributes and calculate actual performance parameters for each attribute. DRIQ processor may use different techniques to compute performance parameters.

In an embodiment, DRIQ processor 131 may use Single Identity Quotient Attribute Measurement (SIQAM) techniques. SIQAM 132 may perform performance measurement calculations. For example, when IDAM system 170 is deployed in a standalone environment and connected to resources below a minimum threshold, SIQAM 132 may be useful for measuring performance. Single identity quotient attribute 'S(A)' measurement may be the ratio between expected output, D(A), and actual output, R(A), after processing the data by the identity management system (e.g., IDAM system 170). Expected output may be data that is shared by IDAM system 170 to IMA Importer 140 through IMA interface 150. The data may be initially stored in PAT 138. Actual output may be the output obtained after processing the data in the real time dynamic environments, such as those that may be stored in IAT 139, along with the network and resource constraints applicable to IDAM system 170. SIQAM 132 may take each attribute as input and calculate S(A)=D(A)/R(A) for each attribute individually. SIQAM 132 may update this information in IAT 139 with the actual values calculated from the ratio.

In an embodiment, DRIQ processor 131 may use Multiple Identity Quotient Attribute Measurement (MIQAM) techniques. MIQAM 133 may perform performance measurement calculations. When IDAM system 170 is deployed in a cluster arrangement or a high availability environment MIQAM 133 may be useful in calculating performance parameters. For example, IDAM systems that are connected to more resources or work in active-active or active-passive mode may find increased utility in MIQAM techniques. Multiple identity quotient attribute 'S($A_n$)' may be a ratio based on results grouped identity attributes used for performance measurement. MIQAM 133 may perform calculations similar to SIQAM 132, however, MIQAM 133 may group of attributes as input to calculate the performance. For example, $$D(A_n)=D(A_1+A_2+A_3+\ldots A_n)$$

$$R(A_n)=R(A_1+A_2+A_3+\ldots A_n)$$

Where $A_1$, $A_2$, $A_3$, ... $A_n$ may represent a collection of attributes that belong to the same service and/or component. Using these D(A) and R(A) MIQAM calculations, S(An) may be calculated as:

$$\begin{aligned}S(A_n) &= \text{Expected Output/Actual Output} \\ &= D(A_n)/R(A_n) \\ &= D(A_1+A_2+A_3+\ldots A_n)/R(A_1+A_2+A_3+\ldots A_n)\end{aligned}$$

Using the formula above, MIQAM 133 may take a group of attributes as input and calculate the ratio S($A_n$) for the group. MIQAM 133 may update the listing in IAT 139 with the calculated ratio values.

Process 200 may render recommendations in step 220. In an embodiment, IPM 110 may identify potential performance improvements in step 220. QM composer 135 may calculate values corresponding to various modes, such as HQM, IQM, PQM. QM composer may provide the resulting values to IMA exporter 120 for use by the corresponding processor (e.g., HQM 122, IQM 124, and PQM 126). QM composer 135 may use values from IAT 139 and PAT 138 to perform the calculations. For example, predefined attribute data may be used with real-time performance data to identify a particular mode of operation based on the results from the S(A) or S(An) calculation performed by DRIQ processor 131. For example, the modes may be described as follows:

HQM: High Quotient Mode
When the ratio value D(A)/R(A) is greater than or equal to 1.0, the performance may be considered "High." e.g., S(A)=D(A)/R(A)≥1.0

IQM: Interim Quotient Mode
When the ratio value D(A)/R(A) is between 1.0 and 0 (exclusive), the performance may be considered "Interim." e.g., S(A)=D(A)/R(A)<1.0; and D(A)/R(A)>0

PQM: Poor Quotient Mode
When the ratio value D(A)/R(A) is less than or equal to 0, the performance may be considered "Poor." e.g., S(A)=D(A)/R(A)≤0

In the examples, S(An) may be used instead, or in addition to S(A), to determine the mode.

In an embodiment, the calculated values HQM, IQM, and PQM may be sent to the respective stores in IMA exporter 120 (e.g., HQM 122, IQM 124, and PQM 126). Report generator 128 may generate a report to provide feedback on performance quality. For example, report generator 128 may generate different graphs and reports which provide the details about performance quality of the components and services. Using report results, IPM 110 may identify improvements to transition from PQM or IQM to HQM.

In an embodiment, IPM 110 may iterate process 200 as IDAM system 170 progresses through different modes to improve performance. When operating in HQM, IDAM system 170 may operate more efficiently with reduced downtime. Therefore, by identifying operating parameters to function in HQM, IDAM system 170 may produce major cost savings, eliminate outages, and optimize accuracy.

In an embodiment, DRIQ processor 131 may identify the potential modes of operation (e.g., HQM, IQM, PQM). The results of DRIQ processor 131 may be used by IPM 110 to identify the performance parameters for HQM operation in a given IDM architecture.

Figure 8:
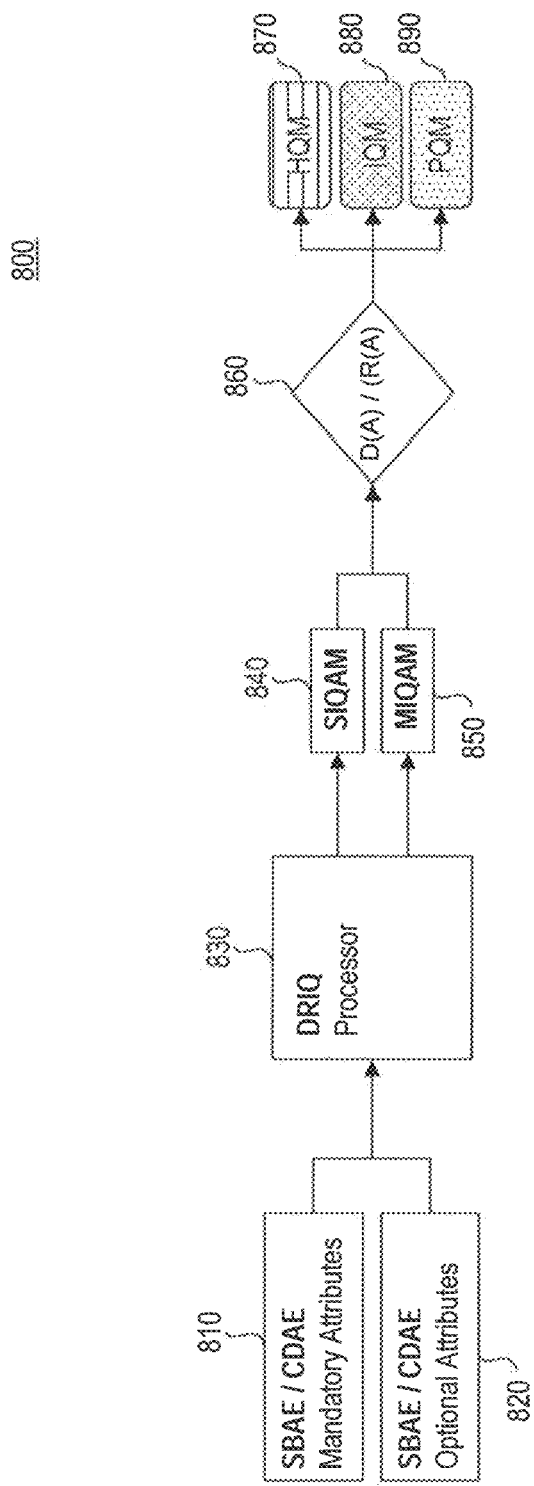
FIG. 8 is a flow diagram illustrating an exemplary mode identification process in accordance with some embodiments of the present disclosure.

FIG. 8 illustrates an exemplary workflow for determining three modes of operation. Workflow 800 may begin by DRIQ processor 830 receiving mandatory attributes 810 and/or optional attributes 820 (e.g., attributes Identified in step 210 of process 200). DRIQ processor 830 may produce SIQAM data 840 and/or MIQAM data 850 using the attributes. SIQAM data 840 may measure the ratio between expected results D(A) with the experienced results R(A) of a single attribute in an identity standalone service. MIQAM data 850 may measure the ratio between expected results D(A) with the experienced results R(A) of a group of attributes in an identity cluster service. DRIQ processor 830 may use SIQAM data 840 and/or MIQAM data 850 to identify the identity quotients. For example, when the ratio D(A)/R(A) is less than or equal to zero, DRIQ processor 830 may mark the result as PQM 890. When the ratio D(A)/R(A) is greater than zero, but also less than 1.0, DRIQ processor 830 may mark the result as IQM 880. Further, when the ratio D(A)/R(A) is greater than or equal to 1.0, DRIQ processor 830 may mark the result as HQM 870.

Figure 9:
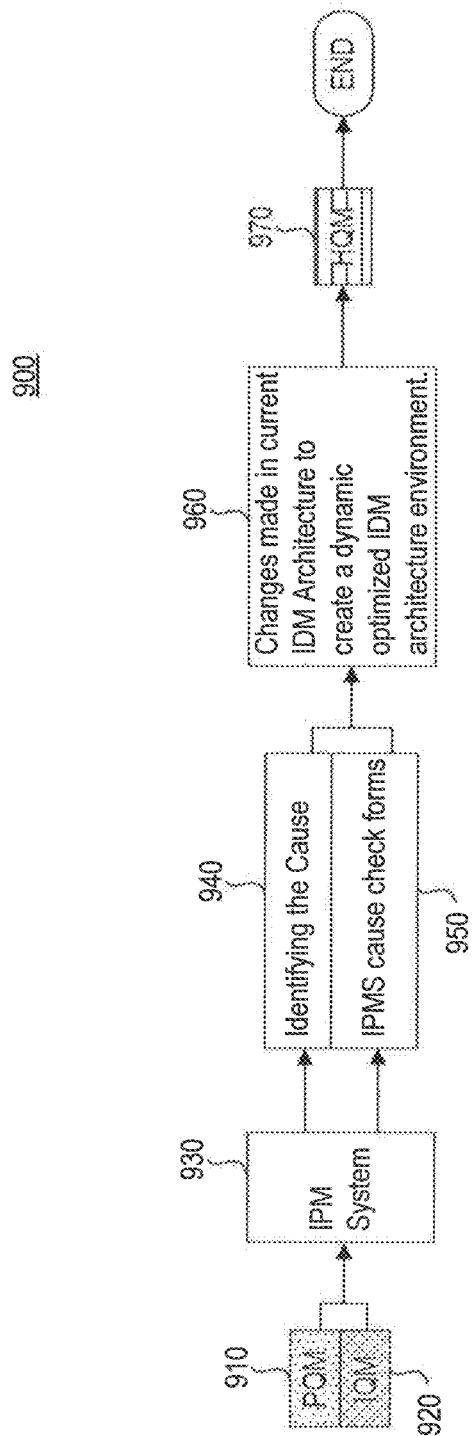
FIG. 9 is a flow diagram illustrating an exemplary modification process in accordance with some embodiments of the present disclosure.

FIG. 9 illustrates exemplary diagram of process 900. In an embodiment, After the modes have been identified all the PQM and IQM may be passed to IPM 110 to identify the cause of the result. For example, as illustrated in process 900, PQM 910 and/or IQM 920 may be received by IPM 930. DRIQ processor 131 may analyze historical data to identify the cause of mode (step 940). For example, DRIQ processor may identify a particular component, service, or attribute that is causing poor performance. IPM 930 may generate diagrams illustrating the cause of a specific performance mode. For example, IPM 930 may generate cause check forms that include graphs and parameters (step 950) which may be used by IPM architects to implement necessary changes to IDM systems (e.g., IDAM system 170) (step 960). Once the changes from step 960 have been implemented in the IDM architecture, IPM 930 may reassess the IDM system. IPM 930 may determine that additional changes should be made. Alternatively, IPM 930 may determine that HQM has been reached. For example, IPM 930 may indicate that the IDM architecture has optimized performance.

FIG. 10A and FIG. 10B illustrate an exemplary feedback table. Table 1000 may be stored in IAT 139. In an embodiment, IPM 110 may create graphical output to provide feedback on the IDM system performance. For example, charts and graphs may easily convey which services operate properly and which services underperform (e.g., fail on first run). Table 1000 organizes data based on resources, so that evaluations may be clearly identified. For a given resource, IPM 110 may indicate in table 1000 the operating mode (e.g., HQM, IQM, PQM), as well as the expected output (R(A)) and the actual output (D(A)). Table 1000 may include process identifiers, timestamps, statistical data, and evaluations to indicate how to improve IDM operation.

When a particular service is identified by IPM 110 as the originating point of a performance problem, an automated checklist may be performed on the IDM system. An exemplary checklist is illustrated in Table 1 below. IPM 110 may iterate through the checklist for a particular service that has been identified as underperforming (e.g., PQM).

TABLE 1

Example IPM Cause Checklist

| Checklist | Yes | No |
|---|---|---|
| Version compatible | | |
| Components are up to date | | |
| All the resources available Before execution BER | | |
| All the resources available After execution AER | | |
| Network connectivity | | |
| Service restart Successful | | |
| Component downgrade required | | |
| Vendor issue | | |
| Other | | |

In an embodiment, IPM 110 may create graphical output to provide feedback on the IDM system. For example, IPM 110 may create a cause check form. The cause check form may include recommendations for additional changes to the architecture of an IDM system. The service form may include detail on specific steps to perform to reach HQM status. An example form is shown below in Table 2.

TABLE 2

Example Cause check Form

| Occurrence of failure: | Occurrence of success: |
|---|---|
| Service name: | Component name: |
| BER: | AER: |
| Current Version: | Previous Version: |

TABLE 2-continued

Example Cause check Form

| Network connectivity: | CPU Usage: |
| Priority: | workload level: |
| Defect in IDM architecture: | Known Issue: |
| Solution: | |

IPM 110 may direct IDM architects to make necessary changes in the current architecture of an organization. IPM 110 may contain information indicating how the issue preventing the system, component, or service from function from operating in HQM may be resolved. For example, IPM 110 may indicate that the issue may be resolved by downgrading a particular software version or upgrading a component of the architecture.

In an embodiment, IPM 110 may continue to run a specific component has fixed. For example, process 200 may continuously run, iterating between PQM and IQM for various components and services, until the entire architecture reaches HQM status. After identifying an architecture configuration that operates in HQM, IDM services may run without error using an optimal balance between resource usage and performance.

Figure 11:
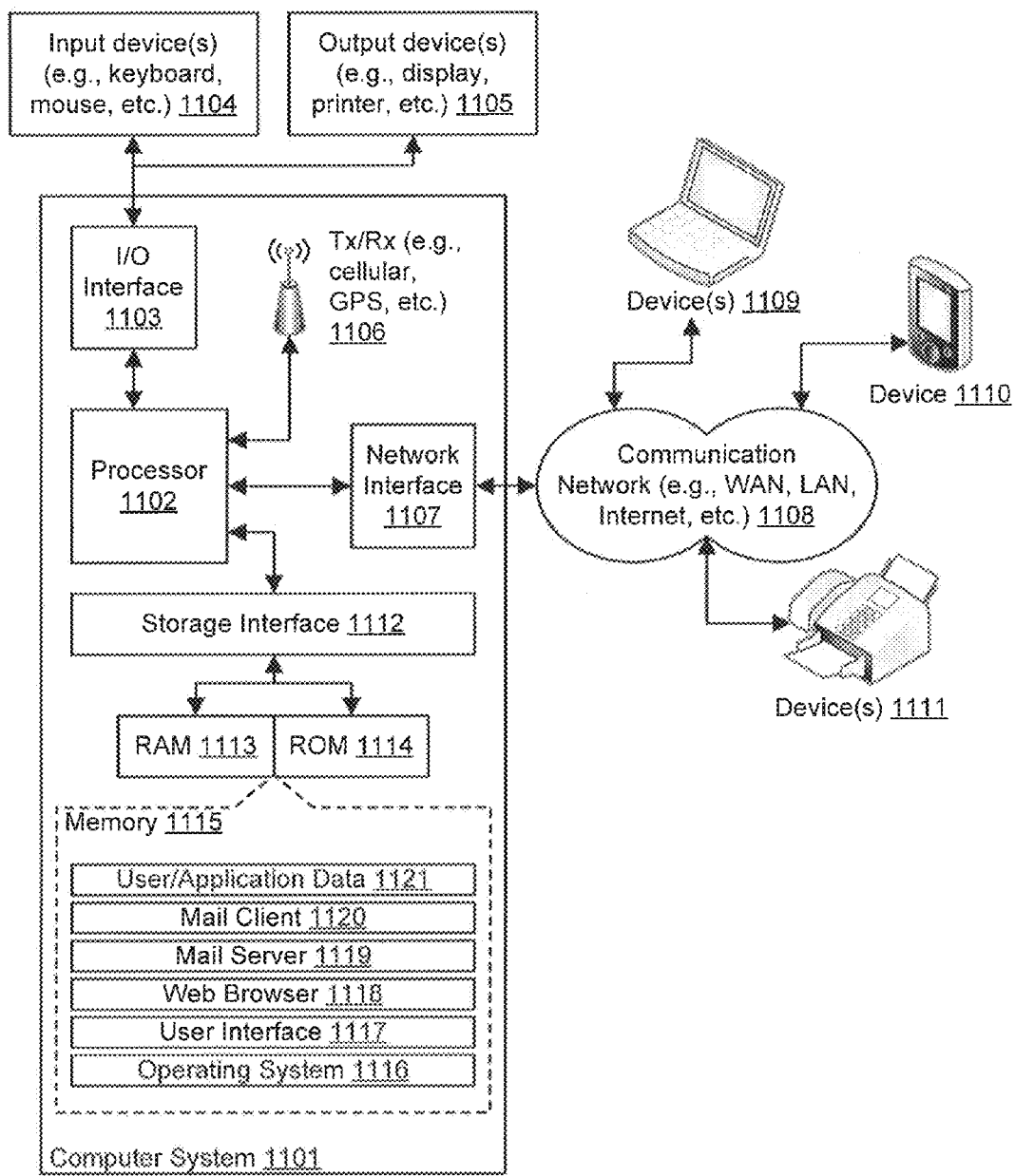
FIG. 11 is a block diagram of an exemplary computer system for implementing embodiments consistent with the present disclosure.

FIG. 11 is a block diagram of an exemplary computer system for implementing embodiments consistent with the present disclosure. Variations of computer system 1101 may be used for implementing IPM 110 (including IMA exporter 120, IMA engine 130, and IMA importer 140), resources 160 and IDAM system 170. Computer system 1101 may comprise a central processing unit ("CPU" or "processor") 1102. Processor 1102 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1102 may be disposed in communication with one or more input/output (I/O) devices via I/O interface 1103. The I/O interface 1103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 alb/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1103, the computer system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1105 may be a printer, fax machine, video display (e.g., cathode ray tube (CRT), liquid crystal display (LCD), light-emitting diode (LED), plasma, or the like), audio speaker, etc. In some embodiments, a transceiver 1106 may be disposed in connection with the processor 1102. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1102 may be disposed in communication with a communication network 1108 via a network interface 1107. The network interface 1107 may communicate with the communication network 1108. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1108 may include, without limitation, a direct interconnection, local area network (LAN), wide area network (WAN), wireless network (e.g., using Wireless Application Protocol), the Internet, etc. Using the network interface 1107 and the communication network 1108, the computer system 1101 may communicate with devices 1110, 1111, and 1112. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1101 may itself embody one or more of these devices.

In some embodiments, the processor 1102 may be disposed in communication with one or more memory devices (e.g., RAM 1113, ROM 1114, etc.) via a storage interface 1112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, resources 160, server parameters 141, resource parameters 142, IDM attributes 145, components data 147, services data 148, custom parameters 149, PAT 138, and IAT 139.

The memory devices may store a collection of program or database components, including, without limitation, an operating system 1116, user interface application 1117, web browser 1118, mail server 1119, mail client 1120, user/application data 1121 (e.g., any data variables or data records discussed in this disclosure), etc. The operating system 1116 may facilitate resource management and operation of the computer system 1101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface application 1117 may facilitate display, execution, interaction, manipulation, or operation of program components through textual or graphical facilities. For example, user interfaces may provide computer interaction interface elements on a display system operatively connected to the computer system 1101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1101 may implement a web browser 1118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1101 may implement a mail server 1119 stored program component. The mail server may be an Internet mail server such as Microsoft Exchange, or the like. The mail server may utilize facilities such as ASP, ActiveX, ANSI C++ IC#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1101 may implement a mail client 1120 stored program component. The mail client may be a mail viewing application, such as Apple Mail, Microsoft Entourage, Microsoft Outlook, Mozilla Thunderbird, etc.

In some embodiments, computer system 1101 may store user/application data 1121, such as the data, variables, records, etc. (e.g., parameters of IMA importer 140, data of SIQAM 132 and MIQAM 133, and variable used to generate reports) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for managing performance of identity management services. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented identity management performance control method, comprising:
  receiving, via one or more hardware processors, an identity management architecture specification;
  identifying, via the one or more hardware processors, a plurality of identity management attributes for the identity management architecture specification;
  selecting, via the one or more hardware processors, measurement criteria based on a target environment for implementing the identity management architecture;
  calculating, via the one or more hardware processors, an attribute measurement quotient for the plurality of identified identity management attributes using the selected measurement criteria; and
  generating, via the one or more hardware processors, instructions to improve performance of the identity management architecture in the target environment based on the calculated attribute measurement quotient,
  wherein identifying, via the one or more hardware processors, a plurality of identity management attributes for the identity management architecture specification comprises:
    determining, via the one or more hardware processors, attributes used by services performed by components of the identity management architecture specification; and
    identifying required attributes that are a subset of the determined attributes, wherein the attribute measurement quotient is based on the required attributes.

2. The method of claim 1, wherein identifying required attributes comprises:
   accessing a predetermined list of required attributes;
   updating the predetermined list of required attributes based on real-time values;
   determining whether the determined attributes are required based the updated list of required values.

3. The method of claim 1, wherein identifying required attributes comprises:
   accessing a form used by one of the services;
   analyzing the form to identify required fields;
   identifying attributes associated with the required fields.

4. The method of claim 1, wherein selecting, via the one or more hardware processors, measurement criteria based on a target environment for implementing the identity management architecture comprises:
   determining, via the one or more hardware processors, that the target environment is a standalone environment and that a first resource threshold of the identity management architecture specification is met.

5. The method of claim 4, wherein calculating, via the one or more hardware processors, an attribute measurement quotient for the plurality of identified identity management attributes using the selected measurement criteria comprises:
   calculating, via the one or more hardware processors, for each of the plurality of identified identity management attributes a single measurement that is a ratio of expected performance to actual performance.

6. The method of claim 1, wherein selecting, via the one or more hardware processors, measurement criteria based on a target environment for implementing the identity management architecture comprises:
   determining, via the one or more hardware processors, that the target environment is a cluster environment, that a second resource threshold of the identity management architecture specification is met, and the identity management architecture operates in active-active and active-passive mode.

7. The method of claim 6, wherein calculating, via the one or more hardware processors, an attribute measurement quotient for the plurality of identified identity management attributes using the selected measurement criteria comprises:
   calculating, via the one or more hardware processors, a single measurement that is a ratio of the sum of expected performance for the plurality of identified identity management attributes to a sum of actual performance for the plurality of identified identity management attributes.

8. The method of claim 1, wherein the generated instructions identify a service that produces incorrect results.

9. The method of claim 8, wherein the generated instructions further describe a system upgrade that cause the service to produce correct results.

10. A non-transitory computer-readable medium storing computer-executable application programming interface economy indexing instructions for:
    receiving, via one or more hardware processors, an identity management architecture specification;
    identifying, via the one or more hardware processors, a plurality of identity management attributes for the identity management architecture specification;
    selecting, via the one or more hardware processors, measurement criteria based on a target environment for implementing the identity management architecture;
    calculating, via the one or more hardware processors, an attribute measurement quotient for the plurality of identified identity management attributes using the selected measurement criteria; and
    generating, via the one or more hardware processors, instructions to improve performance of the identity management architecture in the target environment based on the calculated attribute measurement quotient;
    wherein identifying, via the one or more hardware processors, a plurality of identity management attributes for the identity management architecture specification comprises:
    determining, via the one or more hardware processors, attributes used by services performed by components of the identity management architecture specification; and
    identifying required attributes that are a subset of the determined attributes,
    wherein the attribute measurement quotient is based on the required attributes.

11. The computer-readable medium of claim 10, wherein identifying required attributes comprises:
    accessing a predetermined list of required attributes;
    updating the predetermined list of required attributes based on real-time values;
    determining whether the determined attributes are required based the updated list of required values.

12. The computer-readable medium of claim 10, wherein identifying required attributes comprises:
    accessing a form used by one of the services;
    analyzing the form to identify required fields;
    identifying attributes associated with the required fields.

13. The computer-readable medium of claim 10, wherein selecting, via the one or more hardware processors, measurement criteria based on a target environment for implementing the identity management architecture comprises:
    determining, via the one or more hardware processors, that the target environment is a standalone environment and that a first resource threshold of the identity management architecture specification is met.

14. The computer-readable medium of claim 13, wherein calculating, via the one or more hardware processors, an attribute measurement quotient for the plurality of identified identity management attributes using the selected measurement criteria comprises:
    calculating, via the one or more hardware processors, for each of the plurality of identified identity management attributes a single measurement that is a ratio of expected performance to actual performance.

15. The computer-readable medium of claim 10, wherein selecting, via the one or more hardware processors, measurement criteria based on a target environment for implementing the identity management architecture comprises:
    determining, via the one or more hardware processors, that the target environment is a cluster environment, that a second resource threshold of the identity management architecture specification is met, and the identity management architecture operates in active-active and active-passive mode.

16. The computer-readable medium of claim 15, wherein calculating, via the one or more hardware processors, an attribute measurement quotient for the plurality of identified identity management attributes using the selected measurement criteria comprises:

calculating, via the one or more hardware processors, a single measurement that is a ratio of the sum of expected performance for the plurality of identified identity management attributes to a sum of actual performance for the plurality of identified identity management attributes.

17. The computer-readable medium of claim 10, wherein the generated instructions identify a service that produces incorrect results.

18. The computer-readable medium of claim 17, wherein the generated instructions further describe a system upgrade that cause the service to produce correct results.

* * * * *

UNITED STATES PATENT AND TRADEMARK OFFICE
CERTIFICATE OF CORRECTION

| | |
|---|---|
| PATENT NO. | : 9,667,658 B2 |
| APPLICATION NO. | : 14/831148 |
| DATED | : July 25, 2017 |
| INVENTOR(S) | : Shankar Sundaram |

It is certified that error appears in the above-identified patent and that said Letters Patent is hereby corrected as shown below:

In the Claims

Claim 9, Column 17, Line 58, "upgrade that cause" should read --upgrade that causes--.

Claim 18, Column 19, Lines 11-12, "upgrade that cause" should read --upgrade that causes--.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*